United States Patent [19]

Johnson

[11] Patent Number: 4,891,782
[45] Date of Patent: Jan. 2, 1990

[54] PARALLEL NEURAL NETWORK FOR A FULL BINARY ADDER

[75] Inventor: John L. Johnson, Huntsville, Ala.

[73] Assignee: United States of America as represented by the Secretary of the Army, Washington, D.C.

[21] Appl. No.: 135,404

[22] Filed: Dec. 17, 1987

[51] Int. Cl.$^4$ ................................................. G06F 7/50
[52] U.S. Cl. ...................................... 364/786; 364/784
[58] Field of Search ....................... 364/760, 784, 786; 307/201; 360/146.2; 371/21

[56] References Cited

U.S. PATENT DOCUMENTS

| | | | |
|---|---|---|---|
| 4,055,754 | 10/1977 | Chesley | 371/21 |
| 4,754,421 | 6/1988 | Bosshart | 364/757 |
| 4,804,250 | 2/1989 | Johnson | 350/162.12 |

Primary Examiner—David L. Clark
Assistant Examiner—Tan V. Mai
Attorney, Agent, or Firm—Robert C. Sims; Freddie M. Bush

[57] ABSTRACT

A method for performing the addition of two N-bit binary numbers using parallel neural networks. The value of a first register is converted and transferred into a second register in a mathematical fashion so as to add the numbers of the first register into the second register. When the first register contains all zeros then the desired sum is found in the second register.

3 Claims, 2 Drawing Sheets

PARALLEL NEURAL NETWORK FOR A FULL BINARY ADDER

The invention described herein may be manufactured, used, and licensed by or for the Government for governmental purposes without the payment to us of any royalties thereon.

BACKGROUND OF THE INVENTION

Grossberg teaches (Studies of Mind and Brain, Stephen Grossberg, Reidel Publishing Co., Boston, 1982) adaptive neural networks which can be trained to recognize an input distribution and also to recall previously memorized distributions. The former networks are called instars and the latter are called outstars. He further teaches self-regulating subnetworks which provide short-term memory, reset, and activity normalization, and are called shunting, recurrent, inhibitory on-center/off-surround networks.

Symbolic substitution consists of first identifying a given symbol or pattern, and then substituting in its place another symbol or pattern. If the patterns are devised to correspond to binary numbers, and if the replacement rule is devised to correspond to arithmetic rules, then symbolic substitution can be used to design digital computing architectures. This is how the basic relationship can be reduced to practice: Use an instar to recognize a pattern and an outstar to write another pattern and use neural network techniques to perform the substitution act.

SUMMARY OF THE INVENTION

This disclosure describes a new circuit which performs the arithmetic sum of two N-bit binary numbers using parallel neural networks. Previous art requires sequential and serial operations to account for the carry bits which may be generated at each successive partial sum. The method described here is parallel and accounts for all carry operations. It results from the discovery of a fundamental relationship between symbolic substitution and neural networks.

The device embodied by the described circuit is a practical implementation of this basic relationship.

DESCRIPTION OF THE PREFERRED EMBODIMENT

Figure 1:
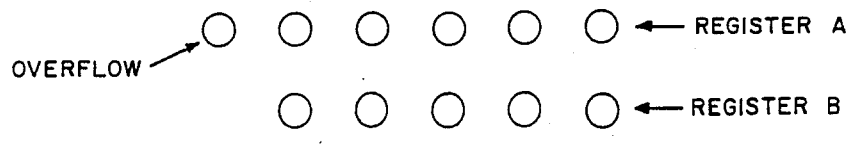
FIG. 1 shows the register symbology.

The binary addition rules are:

```
   01      00      01      00
 + 01    + 01    + 00    + 00
 ----    ----    ----    ----
   10      01      01      00
```

The carry function in adding two numbers causes a lot of lost operation time, as the above addition rules do not directly provide for it.

Consider two N-bit binary numbers in two registers with an overflow bin on the left. Initially the overflow bin is at zero. The first new rule of the present invention is (Rule 1) that if all the top N bits are zero, then the lower register plus the overflow bin contains a number equal to the desired answer.

The new two positional rules are (Rules 2A and 2B)

| (A) the pattern | 1 0 | is replaced by | 0 1 | , and |
|---|---|---|---|---|
| (B) the pattern | 0 1 | is replaced by | 1 0 | |

The last rule (Rule 3) is that no changes are made for any other pattern. These rules, when repeatedly applied, eventually produce a state with all zeros in the top register). Note that we can always begin with zero in the overflow bin (which is considered with the top register for pattern replacement and with the bottom register for the read out of the answer). Thus, at worst, (with all 1's) we can always apply rule 2B there. This generates zeros in the MSB (most significant bit), which allows for rule 2B to be applied again. Thus, rule 2B creates zeros, and rule 2A puts zeros on top. In order for these rules to not interfere, we can require that the replacement action take place much faster than the recognition action.

```
           Example
      0 1 0 1 0 1
    + 0 0 1 1 1 0      (Regular Way)
    -------------
      1 0 0 0 1 1
```

Pattern Way

```
0 [1] [0 1] 0 [1]  →  0 0 1 0 0 0
0 [0] [1 1] 1 [0]     0 1 1 0 1 1,
```

The above operations are all done in parallel.

The above operations are all done in parallel.

```
0 [0 1] 0 0 0  →  0 1 0 0 0 0
0 [1 1] 0 1 1     0 1 0 0 1 1,

[0 1] 0 0 0 0  →  1 0 0 0 0 0
[0 1] 0 0 1 1     0 0 0 0 1 1,

[1] 0 0 0 0 0  →  0 0 0 0 0 0
[0] 0 0 0 1 1     1 0 0 0 1 1.
```

So we now have the arithmetic rules in terms of symbolic substitution rules. Now go to neural instars and outstars to design networks for the rules 2A and 2B. First change everything into elementary neural nodes. Each bin is now a single node with output states 0 and 1 in accordance to the numbers to be added and has a recurrent loop which maintains its value in STM (short term memory). It can receive inputs, and has weights which are positive, zero, or negative/inhibitory. Thus a node can be at zero, then receive +1 and be changed to a +1. Later the node can receive a −1(after weighting) which will reset it to zero. The recurrent loop of a node keeps it in its current state even after the other inputs go to zero.

Recognition: Instar weights are proportional to the pattern to be recognized. For the substitution (outstars), we can take advantage of the fact that we already know the old pattern and can simply inhibit the active sites and excite the inactive sites as required. Thus for rule 2A and 2B we have the neural networks shown in FIGS. 2A and 2B respectively. Finally we can merge them into the overall network for the N-bit adder to get the design of FIG. 5.

Figure 2A:
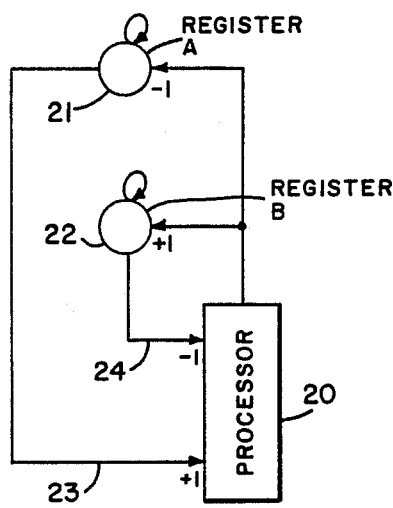
FIGS. 2a and 2b illustrate hardware for Rules A and B.

FIG. 2A shows the hardware for wiring up the registers A and B for operation of rule 2A. The outputs of bins 21 and 22 which are the same significance bit of registers A and B are fed to a processor 20. Processor 20 will have an output if the sum of its inputs 23 and 24 times the weight or operator (+1 or −1) is equal to more than 0. In this case this will only happen if the bin 21 has a positive output put +1 and bin 22 has a zero output. With an output from processor 20 the bin 21 will now have an additional negative input (after weighting) which will cause bin 21 to go to a zero output and bin 22 will have an additional positive input which will cause bin 22 to go to a positive output. From this it can be seen that if bin 21 was originally a +1 and bin 22 a 0, then the processor would cause the shifting of the +1 in bin 21 down to bin 22 as required by rule 2A.

Figure 2B:
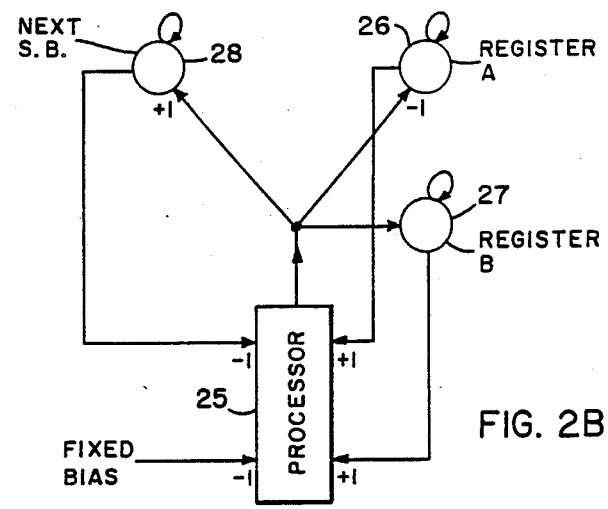

FIG. 2B illustrates rule 2B. The processor 25 will have an output only when the sum of its inputs times the weight factors total a sum greater than 0. Due to the fixed bias input, it can easily be seen that if the next significant bin 28 has a positive output then processor 25 will not have an output even if bins 26 and 27 are positive; therefore, the next significant bit bin 28 has to be a zero. Further it can be seen that if either of the bit bins 26 or 27 of register A and B are zero regardless of bin 28, then the processor will not have an output. So only when both bins 26 and 27 have +1 outputs and bin 28 has a zero output will processor 25 have an output. Processor's 25 output changes the bins 26 and 27 to zeros and changes bin 28 to a plus one in accordance with rule 2B. Any other combination of the bins 26, 27, and 28 will result in no output of the processor and therefore no change of the bins of this circuit.

Figure 3:
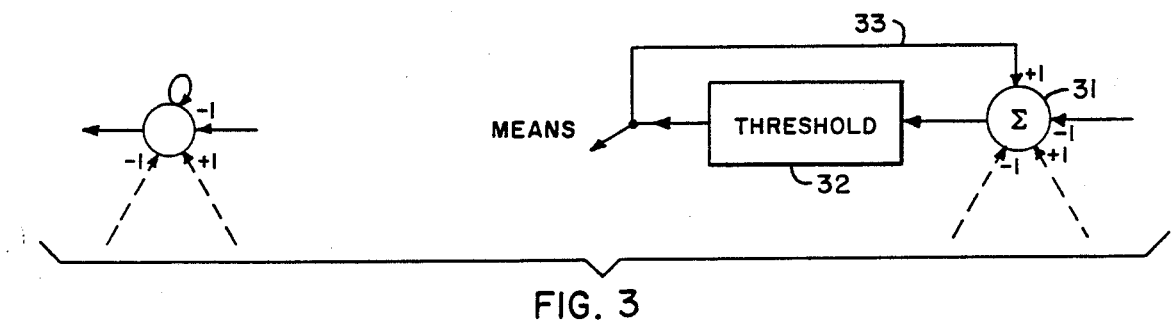
FIGS. 3 and 4 show certain elements in great detail.

FIG. 3 illustrates in greater detail the circuitry of the bins of the registers. A summing device 31 has all the inputs connected to it and it will have an output which is the sum of the total number of inputs times their sign factors. This output could possibly be more than a +1, such as +2; therefore, a threshold device 32 is provided. The threshold device 32 will have a +1 output anytime its input is greater than zero. When the input threshold device 32 is zero or less it will have a zero output. A feedback circuit 33 is provided for maintaining the bin 31 in a positive condition even after the inputs initially causing it to be positive are reduced to zero. This will allow the bin 31 to retain a number once it has been programmed into the bin by either the present circuit or the circuits not shown which set the numbers into the registers A and B.

Figure 4:
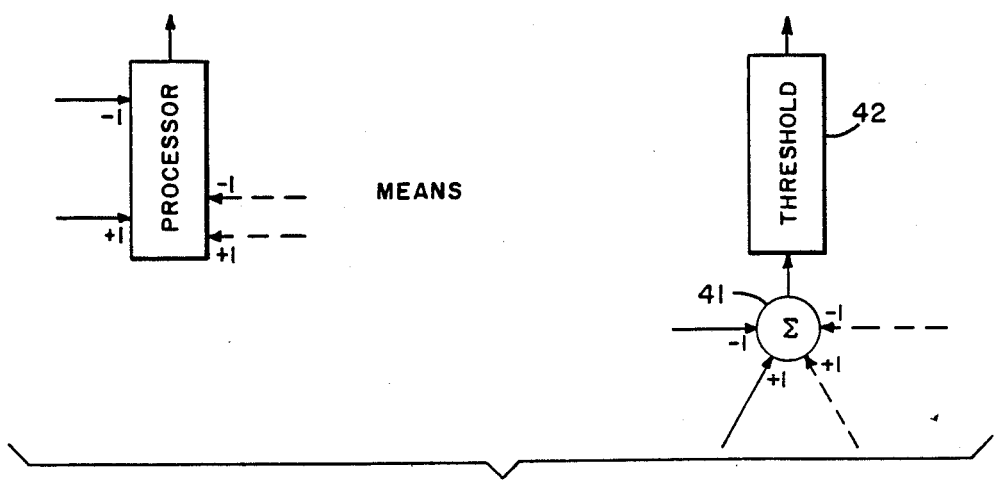

FIG. 4 shows the processor illustrated in greater detail and shows that a summing device 41 is connected to all of the inputs. The output of the summing device will be the sum of all its inputs. A threshold device 42 is provided so as to limit the total output of the circuit to a single 0 or +1 output. The output of the threshold device 42 like the threshold device 32 is a +1 when the input is greater than zero and is a zero when the input is zero or less.

Figure 5:
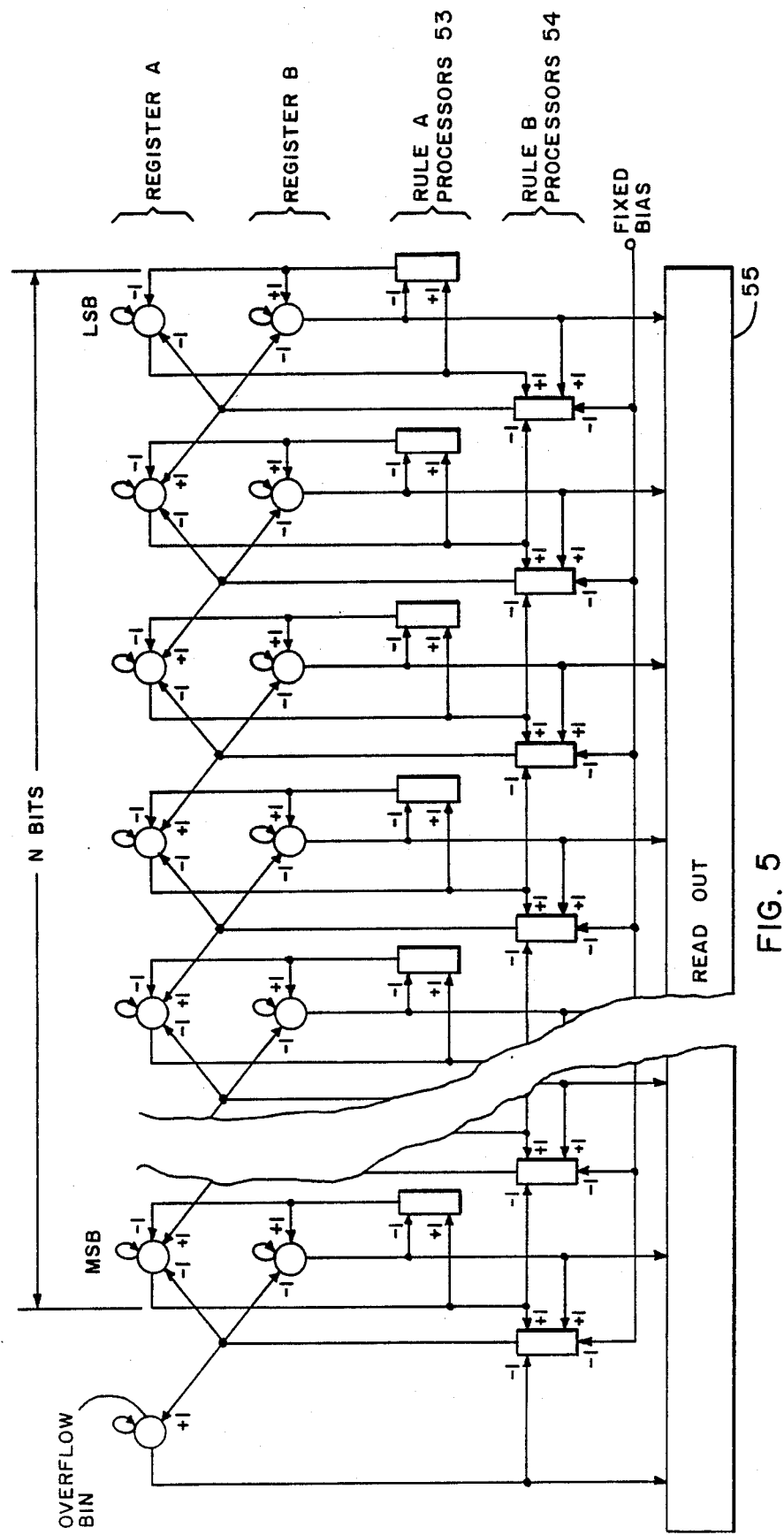
FIG. 5 illustrates an N-bit full binary adder network.

FIG. 5 shows a N-bit full binary adder network in accordance to the present invention. Binary numbers are fed into registers A and B by common circuitry not shown. Appropriate timing circuits (not shown) will cause the processing of the rules 2A and 2B in parallel in accordance with the processors 53 and 54. A readout device 55 is connected to the outputs of register B plus the overflow so as to give a readout of the final state of the values contained in register B.

As is indicated by FIG. 5, the overflow bin is for purposes of comparison indicating as being in register A; however, for the readout it is connected directly to the readout device 55. The timing circuits will cause the operations to continue until zero across the board is found in register A (not counting the overflow bin). At this time the sum of the original values in the two registers will now be register B plus overflow. This can be read out by readout device 55. As can be seen from the circuit, in each timing cycle all the operations take place in parallel. The recognition should be keyed to be slower than the changing of the registers A and B. The mean time to perform the addition depends on the particular binary pattern made by the two particular numbers. It can be as fast as one substitution cycle or as long as approximately N such cycles.

A third register is not necessary in order to add two binary numbers in that register B performs the dual function of containing an original number and acting as a buffer register to contain the sum of the numbers. From analysis of the circuitry it is noted that processors 53 and 54 can never have adjacent units having a one-output simultaneously. Therefore, there can be no potential interference between the output of the processors.

The inputs to the processors could be considered as weighted inputs, and each input indicated with a negative weighting could be implemented by inserting an invertor in series with the line.

I claim:

1. A method for adding a first binary number to a second binary number wherein said first binary number is contained in a first register and said second binary number is contained in a second register comprising the steps of (A) comparing the same significant bit of each of the bits of said first and second registers and only when said first register has a one value and said second register has a zero value, changing the one value in the first register to a zero value and the zero value in the second register to a one value; (B) comparing the same significant bit of each of the first and second registers and the next higher significant bit of said first register, and only when the next higher significant bit has a value of zero and the other bits have a one value, changing the zero value to a one value and the one values to zero values; and (C) repeating steps A and B until the first register has all zero values whereby the second register contains the digital sum of said first and second registers.

2. A method as set forth in claim 1 further comprising the step of performing steps A and B as parallel operations the first time and each repeated time.

3. A method as set forth in claim 2 wherein said first register further has an overflow bin which is regarded for the purposes of step B as the most significant bit plus one of the first register; and said overflow bin considered as the most significant bit plus one of the second register for determining when the first register has all zeros and for determining the digital sum of said first and second digital numbers.

* * * * *